United States Patent [19]
Kano et al.

[11] Patent Number: 5,991,260
[45] Date of Patent: Nov. 23, 1999

[54] DISK CARTRIDGE AND DISK DEVICE USING THE SAME

[75] Inventors: Kiyoshi Kano, Yokohama; Yasuo Ohtsuka, Chigasaki; Mikio Shiraishi, Yokohama; Toshifumi Takeuchi, Yokohama; Masafumi Nakamura, Yokohama; Masayuki Inoue, Yokohama; Yoshio Suzuki, Yokohama; Michio Miura, Yokohama, all of Japan

[73] Assignee: Hitachi, Ltd., Tokyo, Japan

[21] Appl. No.: 08/603,162

[22] Filed: Feb. 20, 1996

[30] Foreign Application Priority Data

| Feb. 20, 1995 | [JP] | Japan | 7-030414 |
| Feb. 20, 1995 | [JP] | Japan | 7-030415 |
| Mar. 6, 1995 | [JP] | Japan | 7-045247 |
| Jun. 3, 1995 | [JP] | Japan | 7-045246 |

[51] Int. Cl.$^6$ .............................. G11B 3/70; G11B 23/03
[52] U.S. Cl. ............................. 369/291; 360/133
[58] Field of Search ................... 360/133, 99.02, 360/99.06; 369/291, 77.1–77.2, 75.1–75.2

[56] References Cited

U.S. PATENT DOCUMENTS

| 3,715,040 | 2/1973 | Polus et al. | |
| 4,689,705 | 8/1987 | Oishi et al. | 360/133 |
| 4,876,619 | 10/1989 | Suzuki | 360/97.01 |
| 4,989,191 | 1/1991 | Kuo | 369/33 |
| 5,272,693 | 12/1993 | Fujisawa | 369/291 |
| 5,293,293 | 3/1994 | Iwata et al. | 369/291 |
| 5,303,214 | 4/1994 | Kulakowski et al. | 360/36 |
| 5,530,691 | 6/1996 | Fujisawa | 36/291 |
| 5,539,599 | 7/1996 | Wilder | 369/291 |
| 5,748,609 | 5/1998 | Tanaka | 369/291 |
| 5,757,764 | 5/1998 | Tanaka | 369/291 |
| 5,825,747 | 10/1998 | Tanaka | 369/291 |

FOREIGN PATENT DOCUMENTS

| 000355011 | 2/1990 | European Pat. Off. | 369/291 |
| 2-128388 | 5/1990 | Japan | 369/291 |
| 4-1985 | 1/1992 | Japan | 369/291 |
| 5-28692 | 2/1993 | Japan . | |
| 5-81815 | 4/1993 | Japan . | |
| 5-242625 | 9/1993 | Japan . | |
| 6-12810 | 1/1994 | Japan | 369/291 |
| 6-84315 | 3/1994 | Japan . | |
| 6-180958 | 6/1994 | Japan . | |
| 3002033 | 9/1994 | Japan . | |
| 6-267226 | 9/1994 | Japan . | |
| 2272990 | 6/1994 | United Kingdom | 369/291 |

*Primary Examiner*—Allen T. Cao
*Attorney, Agent, or Firm*—Antonelli, Terry, Stout & Kraus, LLP

[57] ABSTRACT

A disk cartridge and a disk device for receiving the disk cartridge to enable recording and/or reproducing of information from or on a disk housed within the disk cartridge. The disk cartridge includes a disk in which information is recorded and/or reproduced, a case for housing the disk which case has opposite faces including a window in a respective face for exposing a part of the disk therethrough. A shutter is mounted with respect to the case so as to open or close a window of a respective face of the case with the shutter being movable in opposite directions with respect to the window from a position in which the window is closed to a position in which the window is open. The disk cartridge may include an openable part of the case for enabling the disk to be taken in and out of the case through the openable part thereof and a discrimination arrangement for enabling discrimination of different types of disk cartridges from one another. The disk cartridge may be arranged to enable exchange of disks of a same or different format including CD (compact disk), DVD (digital video disk) and PD (phase change disk) and the discrimination arrangement enables prevention of a disk cartridge of one different type from being erroneously inserted into a disk device receiving apparatus which is not compatible for the different type of disk cartridge.

65 Claims, 13 Drawing Sheets

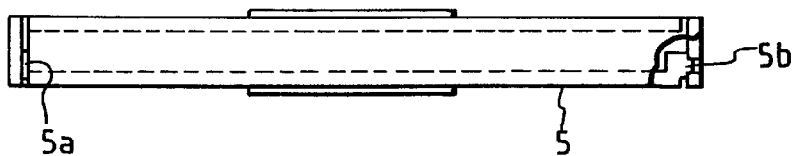
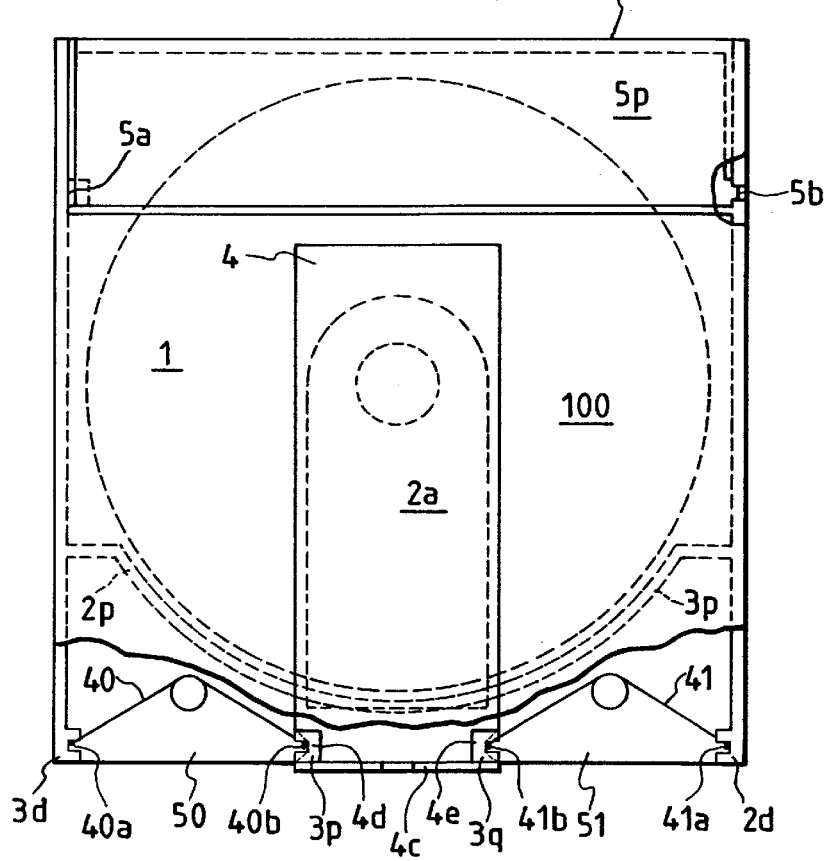
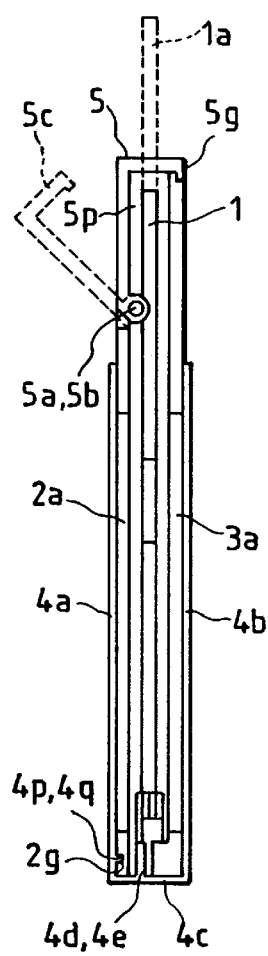
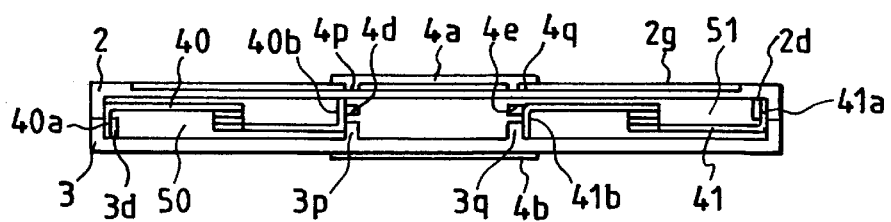

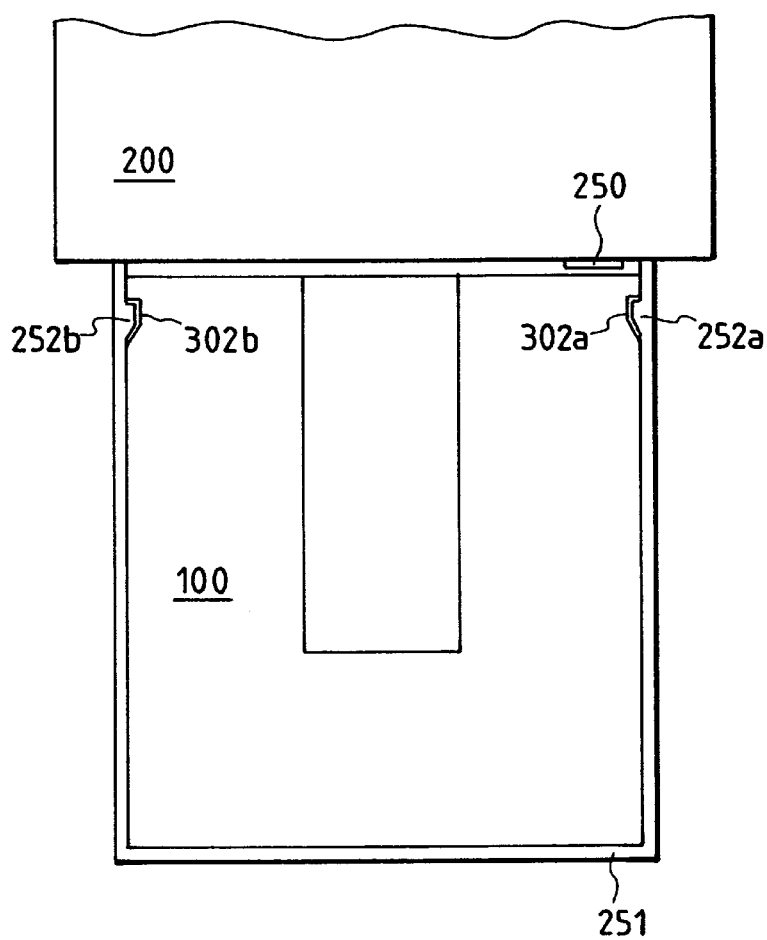
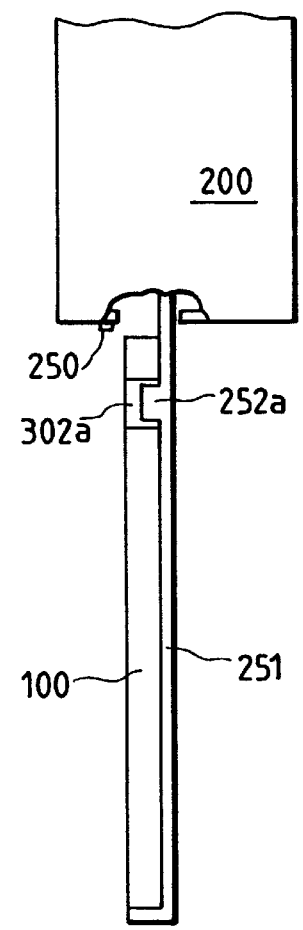
FIG. 11(a)
FIG. 11(b)

FIG. 12(a)
FIG. 12(b)
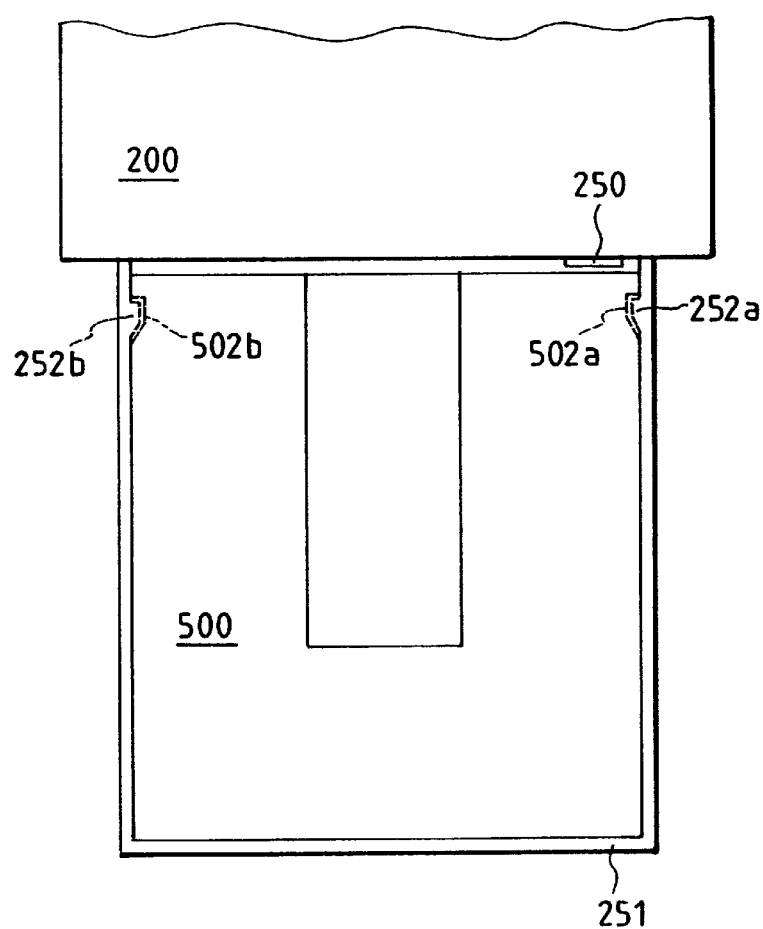
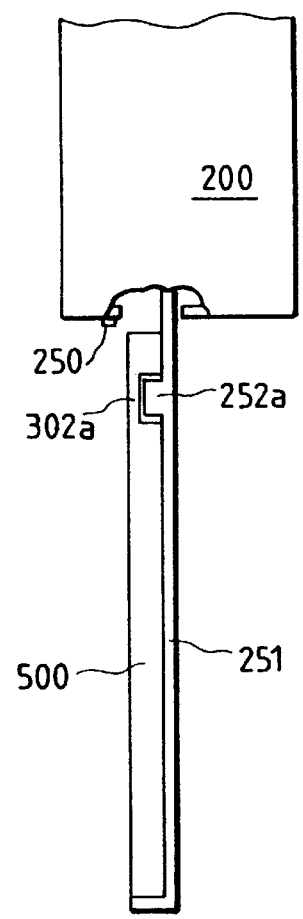

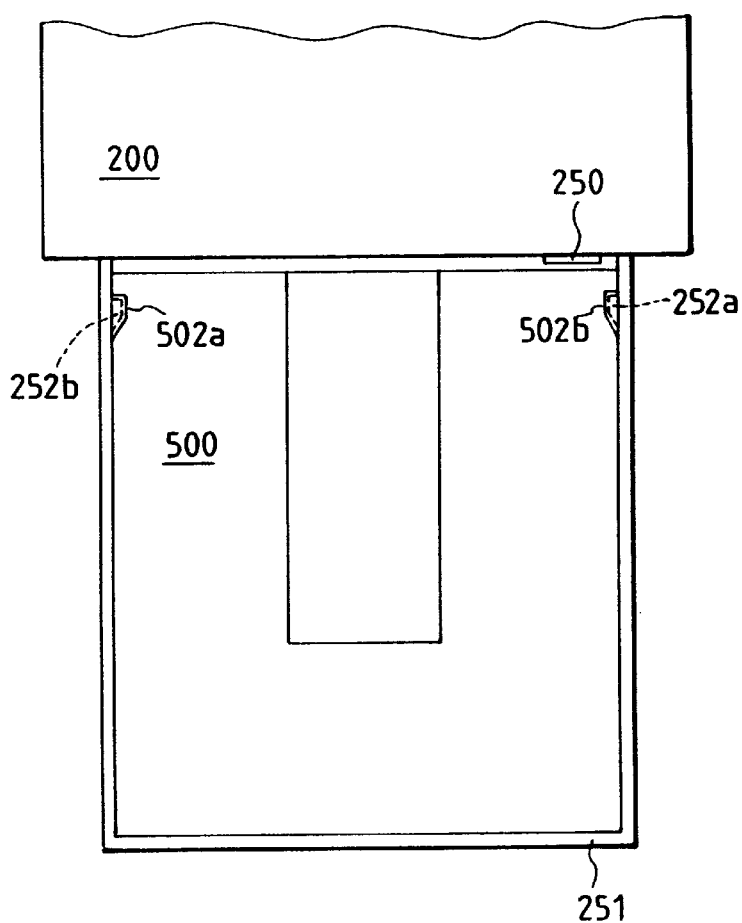
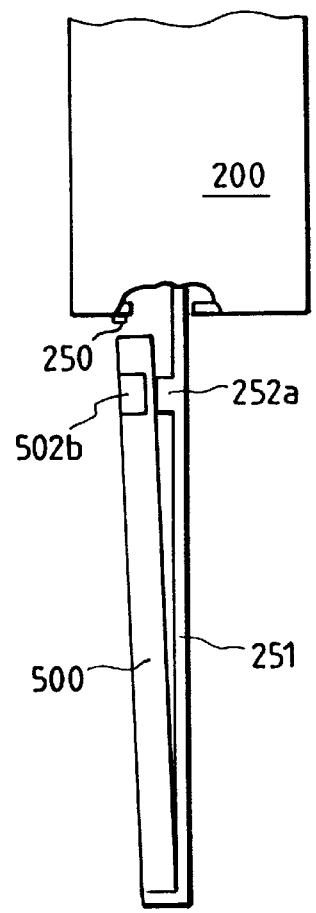
FIG. 13(a)
FIG. 13(b)

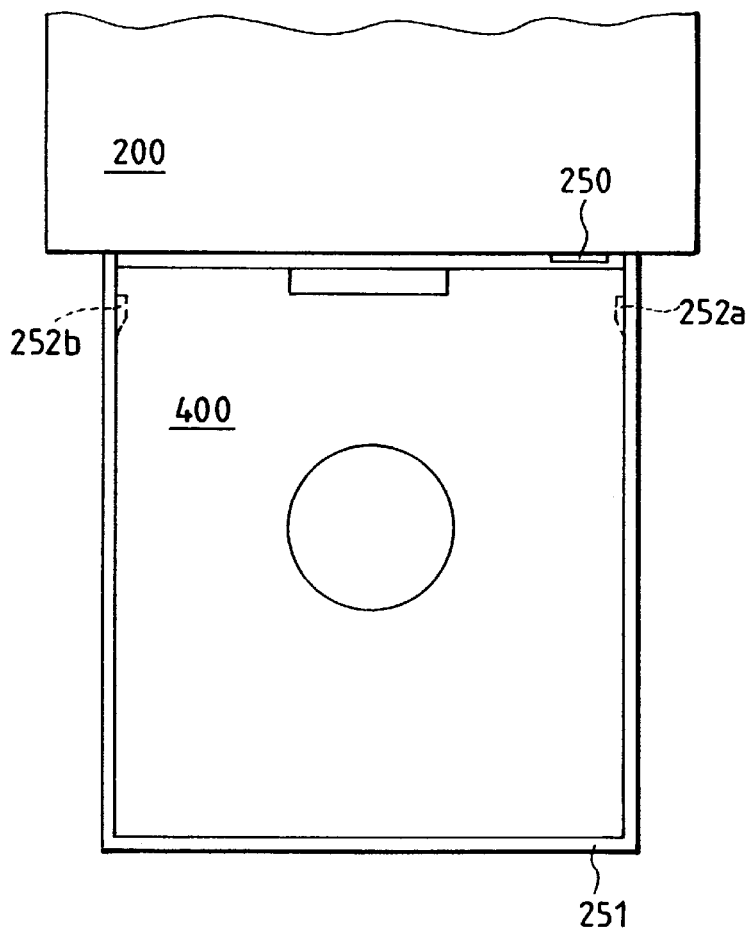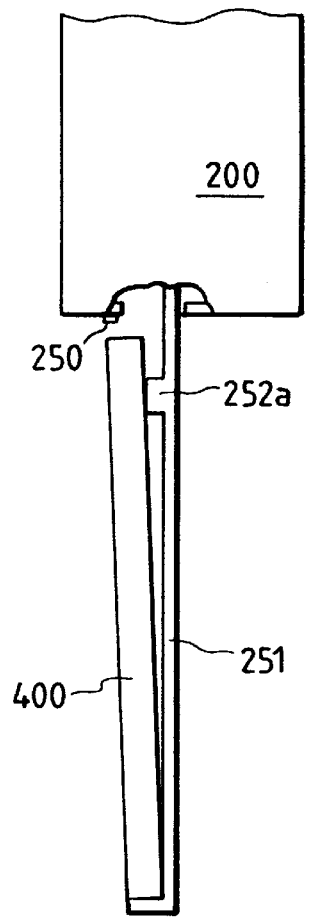

FIG. 15(a)
FIG. 15(b)
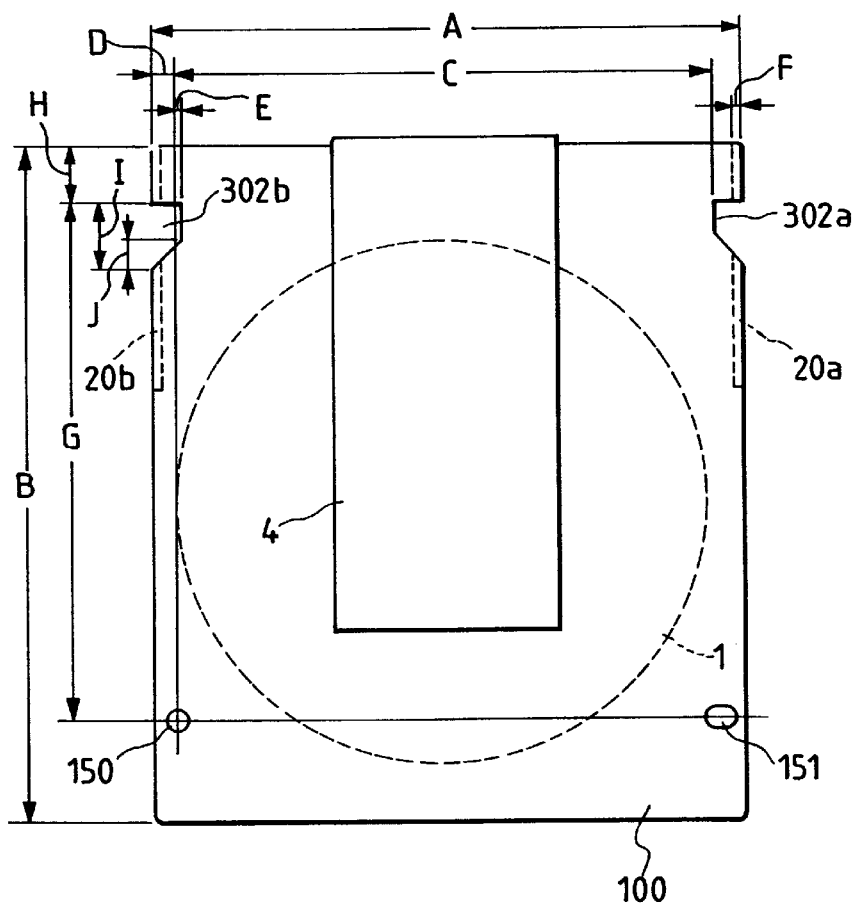
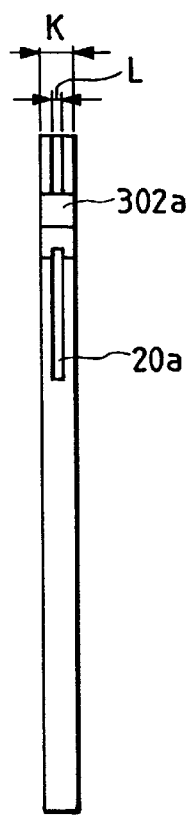

DISK CARTRIDGE AND DISK DEVICE USING THE SAME

The present invention relates to a disk cartridge, a disk cassette, a disk caddy, a disk half or a disk case for housing a disk-shaped recording medium such as an optical disk, and a disk device using the same.

BACKGROUND OF THE INVENTION

A compact disk (hereinafter, referred to as "CD") system, which has been standardized in the so-called "red book", the so-called "yellow book" or the like and in which information is recorded in a disk having a diameter of 120 mm, and which is used mainly for music information has been widely adopted. This system has an almost sufficient capacity for handling music information, but when recording video information as in a CD-ROM, its capacity becomes insufficient for an increased amount of information, thus resulting in insufficient recording time or degraded image quality. Attempts to deal with this problem includes, for example, a digital video disk (hereinafter referred to as "DVD") system and the like.

In the aforementioned CD system, the disk is mainly used on only one side or face for exclusive reproduction. Also, the disk is often handled in a bare state, and a tray loading system, in which the disk is mounted on a drawer-shaped tray coming out from a disk device, is mainly used because of its good operability. On the other hand, however, a disk cartridge, which is called a CD caddy, as described in Japanese Laid-Open Patent Application No. 63-153376 and in Japanese Laid-Open Patent Application No. 63-47472, capable of taking a disk out and in, is used, and a front loading system for inserting this disk cartridge into the device is also utilized.

In addition, in the aforementioned DVD system, the disk is used on both sides or faces for recording and/or reproduction. The disk tends to be housed in an exclusive cartridge primarily for protection from the standpoint of securing the reliability resulting from higher density recording.

Further, in contrast to the CD system, which is mainly used for exclusive reproduction, there has also been announced a PD (Phase-change Disk) system capable of rewriting, as described in Optical Disk System for Multimedia National Technical Report, Vol. 4, No. 6, December 1994, pgs. 129–136. In this PD system, the disk is used on one side for recording and/or reproduction. Also, the disk is housed in an exclusive cartridge from the standpoint of securing the reliability resulting from rewriting.

Disks for use with each system of the aforementioned CD, DVD and PD all have a diameter of 120 mm, and cartridges for each system described above are of nearly the same shape, having the same dimensions.

The problem to be solved by the present invention is to increase the capacity of the CD system or a disk system having nearly the same dimensions as the CD system, and the concept and technical problems for the disk cartridge and disk device using the same to deal with the problem are described below.

1) In order to take measures against scratching, dust and dirt resulting from higher density recording, a state in which a disk has been placed in a cartridge is supposed to be a standard. Even in the CD system, there is present a case called a "CD caddy" which is about 135 mm long, about 125 mm wide and about 8 mm thick, but this CD caddy is not used currently. Rather, the so-called tray loading system is mainly used.

2) Allowing both faces of the disk to be recorded. The CD is for one side recording and the capacity can be doubled by simple calculation.

3) Making a disk which is CD compatible and reproducible In a disk device using a new disk cartridge, its sales point is to make the existing CD compatible and reproducible. Accordingly, it is an indispensable condition to enable taking a disk in and out and having a disk for CD system within. However, the CD caddy is for one-side recording, and a clamper of the disk is attached on the side of the caddy case. The clamper is constructed to be on the side of the disk device because the new disk cartridge is of a both-face recording system. Thus, if the CD caddy is mounted to a disk device for the new disk cartridge, two clampers will interfere with each other. Therefore, it is necessary to prevent the CD caddy from being mounted to the disk device of the new disk cartridge.

4) Supply of the disk and disk cartridge at a low price. In order to reduce the price for general family usage, the disk cartridge including the disk device is required to be constructed at low cost.

Further, when increasing the capacity as described above, the mixed existence of three similar disk cartridges poses the following problems.

5) Discrimination of disk cartridges for each system

6) Prevention of erroneous insertion

7) The system of mounting the cartridge to the device is made applicable to both the front loading system and the tray loading system.

SUMMARY OF THE INVENTION

It is an object of the present invention to solve the above-described problems, and to provide a disk cartridge with increased capacity and capable of discrimination from similar and different disk cartridges, and a disk device using the same.

In order to solve the aforementioned problems, a disk cartridge and a disk device using the same according to the present invention including the following features.

1) A shutter for the disk cartridge is utilizable for both faces of the disk and is slidable in opposite directions with the structure of the disk cartridge being arranged so that the disk can be taken in and out. Also, the case of the disk cartridge is provided with a structure to prevent a cartridge of a different kind such as the CD caddy from being erroneously inserted.

2) A biasing arrangement for the shutter is provided at a position of the cartridge where the window of the case is closed.

3) When the disk is taken in and out, the structure of the disk cartridge is arranged to open at least a part thereof which is in a plane parallel to a plane of the disk.

4) When the disk is taken in and out, the structure of the disk cartridge is arranged to open a portion of the case at a position other than within a shutter moving range.

5) A disk conforming to the compact disk standards is enabled to be incorporated within the disk cartridge.

6) For biasing the shutter, one each of a torsion spring whose both arm portions directly engage with the case and the shutter is arranged in the corner areas on both sides of the disk cartridge across the shutter in a state in which the window of the case is closed.

7) A disk plane discrimination arrangement is provided which is capable of discriminating whether the plane of the disk on which recording and/or reproduction is performable on one side or both sides of the disk.

8) A disk plane specifying arrangement is provided which is capable of specifying which is the plane of the disk on which recording and/or reproduction is performable.

9) A discrimination arrangement for discriminating different kinds of disk cartridges is provided.

10) For discrimination or improper insertion prevention, a first cutout portion formed by cutting out at least a part of an outer plane of the disk cartridge which extends parallel to the disk plane of the disk for the disk cartridge of a different type, and a second cutout portion formed by cutting out at least a part of the outer plane of the disk cartridge which extends in a direction orthogonal to the disk plane for the disk cartridge of a different type.

11) The first cutout portion is arranged laterally symmetrically with respect to the inserting direction into a disk device.

Each of the aforementioned items 1) to 11) acts in the following manner as described in 1) to 11), respectively.

1) Even when the disk cartridge, which is applicable to both faces of the disk, is turned over for insertion to apply it to both faces or sides of the disk, it is made applicable by using one shutter open-and-close mechanism, thus making the disk within the cartridge replaceable.

2) Even if the shutter is intentionally opened, releasing the opening force automatically closes the shutter.

3) During opening, the disk plane can be easily seen, and the handle ability for taking the disk in and out is improved.

4) Any interference between the shutter and the opening structure is avoided.

5) A disk conforming to the compact disk standards is mountable to a disk device for new disk cartridges.

6) Manufacture of a shutter having a long stroke capable of opening in opposite directions by using a thin cartridge constructed with a small number of parts is enabled.

7) Easy recognition of whether the recording plane of the disk is on one side or both sides is enabled.

8) Easy recognition of which side is the recording plane of the disk is enabled.

9) Discrimination from any cartridge of a different type having nearly the same diameter is enabled.

10) For mounting a cartridge to the disk device, application to the front loading system and/or the tray loading system is enabled.

11) Even if the cartridge is inserted upside down into the device to apply it to both-face or side recording, it is possible to discriminate by one discrimination arrangement provided on the side of the device.

These and other objects, features and advantages of the present invention will become more apparent from the following description when taken in conjunction with the accompanying drawings.

BRIEF DESCRIPTION OF THE DRAWINGS

FIGS. 1(a)–1(d) show a plan view and side views of a disk cartridge according to the present invention.

FIGS. 11(a) and 11(b) show a plan view and a side view of a disk cartridge and a disk device according to the present invention.

FIGS. 12(a) and 12(b) show a plan view and a side view of a disk cartridge of the PD system and a disk device according to the present invention.

FIGS. 13(a) and 13(b) show a plan view and a side view of a disk cartridge of the PD system and a disk device according to the present invention where the disk cartridge is improperly inserted.

FIGS. 14(a) and 14(b) show a plan view and a side view of the CD caddy and a disk device according to the present invention where the CD caddy is attempted to be inserted.

FIGS. 15(a) and 15(b) show a plan view and a side view of the outside dimensions of a disk cartridge according to the present invention.

DESCRIPTION OF THE PREFERRED EMBODIMENTS

Figure 2:
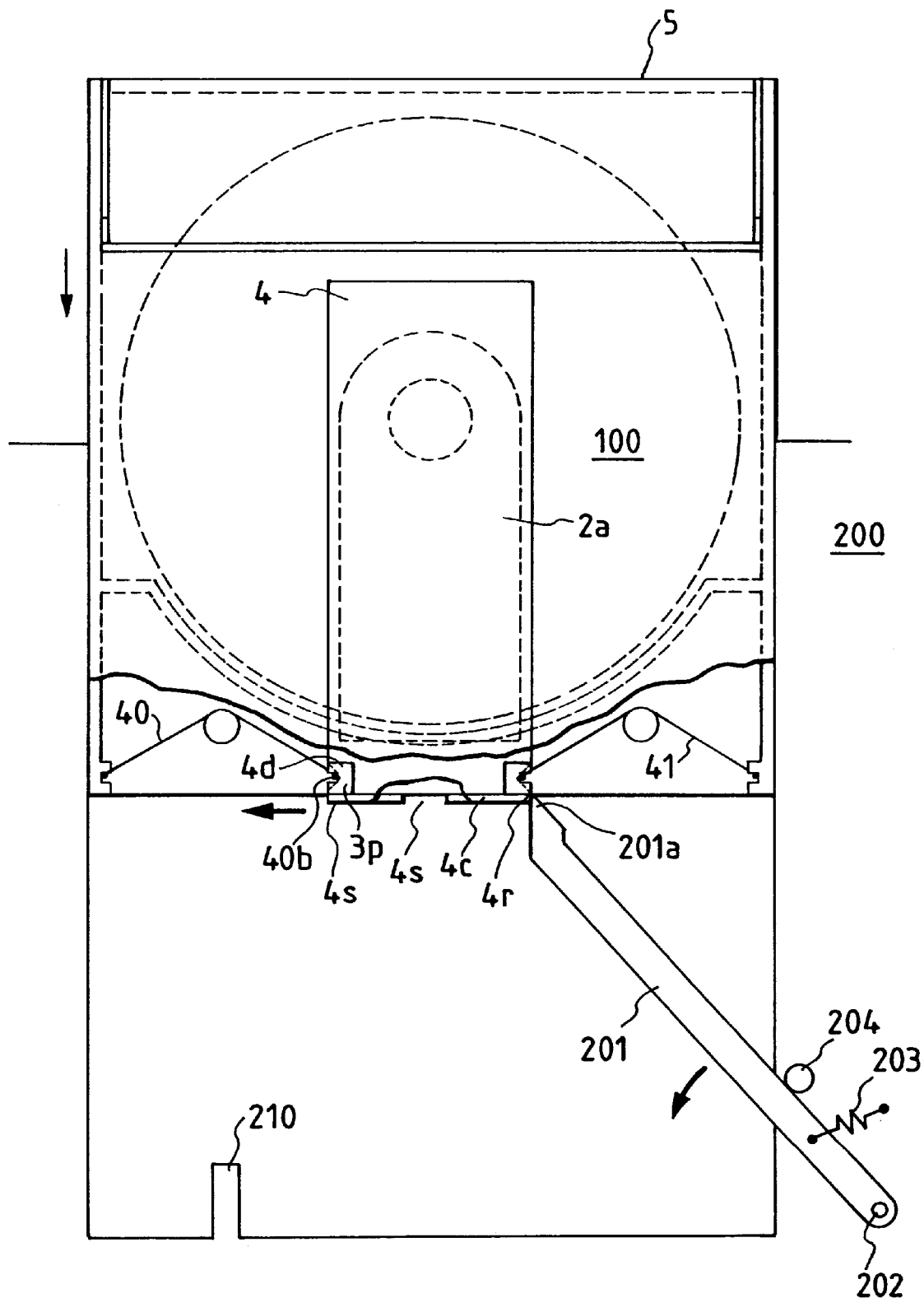
FIG. 2 is a plan view showing a state in which the insertion of a disk cartridge according to the present invention into a disk device has been started.

Referring now to the drawings wherein like reference numerals are utilized to designate like parts, a first embodiment according to the present invention is described in conjunction with FIGS. 1 to 6, which embodiment corresponds to the so-called front loading system. FIGS. 1(a)–1(d) show a disk cartridge according to the present invention, with FIG. 1(a) being a partially exploded plan view, and FIGS. 1(b), 1(c) and 1(d) being side cross-sectional views as viewed from below, from the right side and from above, respectively.

A disk cartridge 100 according to the present invention is basically constituted by a disk 1 for recording information, a case formed by case portions 2 and 3 for housing the disk, a shutter 4 for opening and closing windows 2a and 3a in the case two springs 40 and 41 for biasing the shutter 4 and a door 5 for opening a part of the case. The disk 1 is capable of recording and reproducing a signal on both faces or sides thereof.

The case is formed divided into two sheets represented as case portions 2 and 3 sheets which are bonded together. Each of the case portions is formed with a window 2a or 3a which exposes a part of the disk plane so as to record and reproduce information. Dust-proof barrier plates 2p and 3p are formed between the disk 1 and the springs 40 and 41.

The shutter 4 is integrally formed as a U-shaped character with shutter planes 4a and 4b corresponding to the both faces of the disk respectively, and a side portion 4c, which integrally connects both shutter planes. Projections 4p and 4q engage with a guide groove 2g linearly formed in the case so that the shutter is linearly slidable in the right and left directions in the figure.

The two springs 40 and 41 may be torsion springs which are in a stretched state or helical tension springs, and exert a biasing force so that the shutter planes 4a and 4b of the shutter 4 maintain the windows 2a and 3a at their closing positions respectively. These two springs have the same shape so as not to increase the number of the parts and enabling a cost reduction. Each of these springs shown as torsion springs is mounted at two corner regions 50 and 51, respectively, which regions are provided between the two case 2 and 3, and which laterally sandwich the shutter 4 therebetween. The leading end of the arm of each of the respective springs is bent at a right angle to the axial direction of the coil portion, and each end 40a or 41a engages with a groove portion 2d or 3d at the case corner. Also, each of the other ends 40b or 41b engages with a stopper 3p or 3q having a V-shaped cross-section (see FIG. 3(a)) formed in the case portion 3 so that the springs are positioned with high precision in the up-and-down and the right-and-left directions in the figure because they are in the stretched state as described above. In this respect, according to the present invention, the torsion spring is constructed so that both ends thereof directly engage with the case without using other parts therebetween, thus not increasing the number of parts. Hooks 4d and 4e are integrally formed with the shutter 4 in coincidence with the above-described up-and-down and right-and-left positions of the torsion springs and with a deviation in height of the disk in the direction of thickness thereof, and innermost recesses in the grooves of the hooks 4d and 4e are positioned respectively. Thereby, the shutter 4 is retained at the central position shown in the right-and-left direction, i.e., the sliding direction in the figure.

In this respect, the sides of the case portions 2 and 3 as viewed from the direction of FIG. 1(b) are constructed to be opened, through which it is possible to insert these two springs once in one direction in a bent state for use in the cartridge and representing a very excellent assembly property.

A door 5 pivotally engages with the case 2 at pivot points 5a, 5b to open so that the disk can be taken in and out as shown by dotted lines of 5c and 1a in FIG. 1(c). Since the door 5 has a portion extending in a plane in parallel to the disk plane and this portion is opened, the disk has good visibility and good taking-in-and-out property when the door is opened. In this respect, the door 5 may be constructed to open at the side of the case in a manner similar to the cartridge for an 8 cm CD-ROM which is currently on the market. Also, when a disk such as, for example, a rental disk should not be taken out of the disk cartridge, the door 5 may be eliminated for preventing removal of the disk by a renter.

Figure 3A:
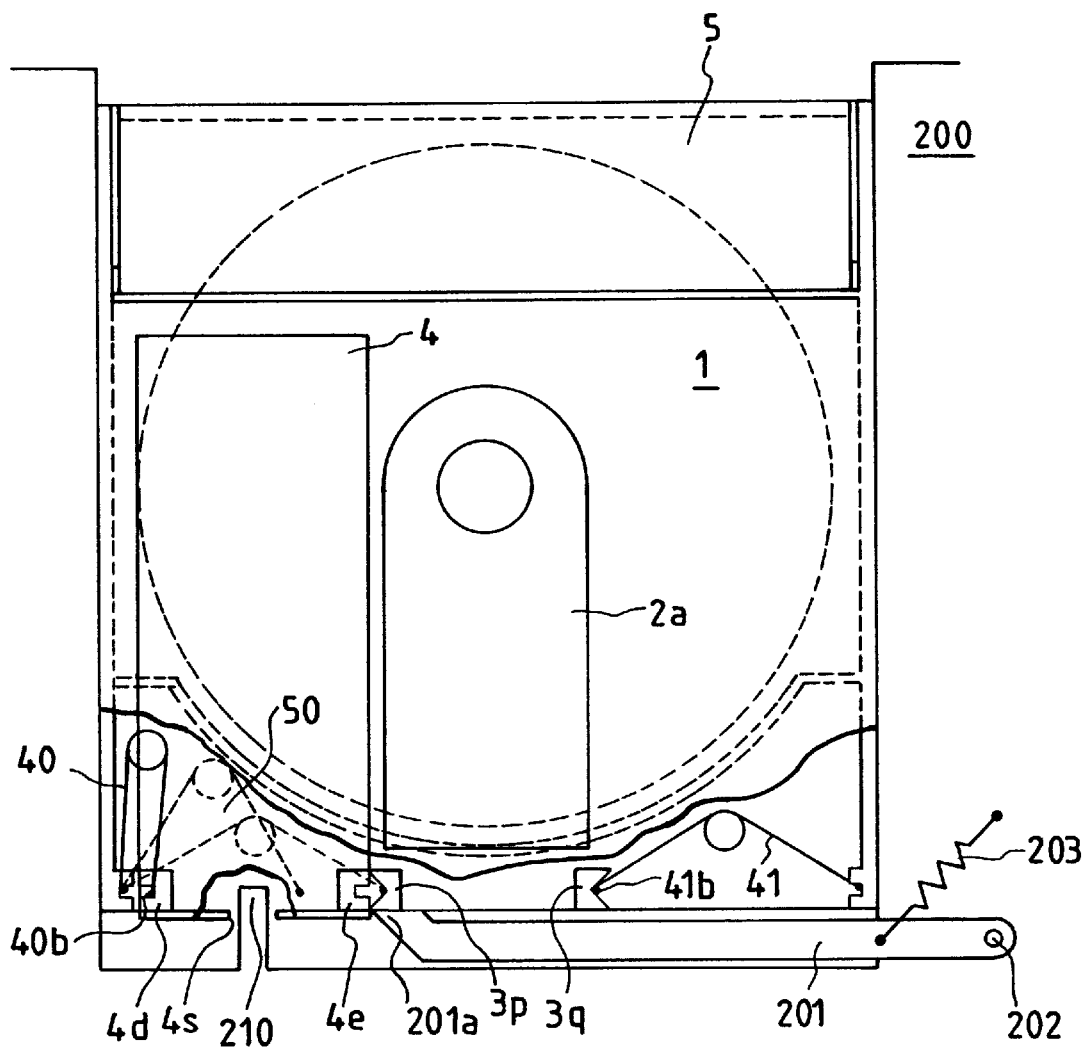
FIGS. 3(a) and 3(b) show a plan view and a side view of a state in which the insertion of a disk cartridge according to the present invention into the disk device has been completed.
Figure 3B:
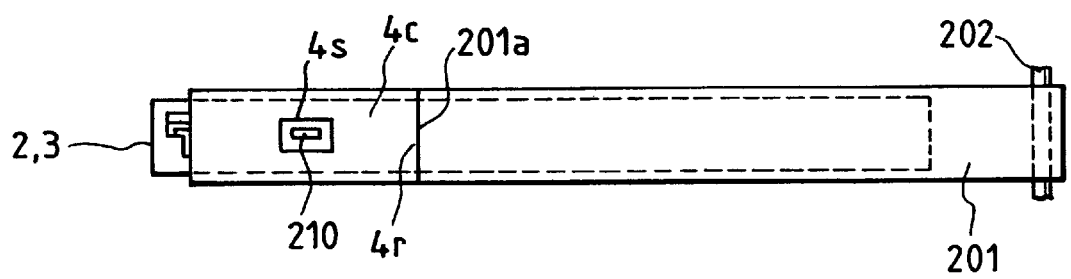

The operation when the shutter opens and closes the window is described with reference to FIG. 2 and FIGS. 3(a) and 3(b). In FIG. 2, when the disk cartridge 100 is inserted into a disk device 200 (a downward direction in the figure), a shutter opening lever 201 of the disk device 200 is supported by a pivot shaft 202 fixed on the device side, is biased clockwise in the figure by the spring 203, and stands by in contact with a stopper 204 so that the leading end 201a of the shutter opening lever 201 abuts an end 4r of the side portion of the shutter 4. When the disk cartridge is further inserted into the interior of the device 200 from this state, the shutter opening lever 201 rotates counterclockwise in the figure so as to cause the shutter 4 to slide toward the left side in the figure. When the sliding is started, the right-hand end 40b of the left-hand spring 40 is urged against the groove in the left-hand hook 4d in the shutter, as shown in FIG. 3(a), to engage therewith and to retract from the projection 3p of the case. On the other hand, while it is remaining urged against and engaged with the projection 3q of the case, the left-hand end 41b of the right-hand spring 41 in the figure retracts from the right-hand hook 4e in the shutter with the right-hand spring 41 retained as it is. With the sliding of the shutter 4, the right-hand end 40b of the left-hand spring 40 linearly moves to be deformed within the corner region 50, as shown in FIG. 3(a). On the side portion 4c of the shutter 4, there is provided a discrimination hole 4s (as shown more clearly in FIG. 3(b)), and at the position where the disk cartridge 100 has been inserted to the innermost position, a projection 210 is provided on the side of the disk device 200 correspondingly to the discrimination hole 4s such that the insertion of the disk cartridge 100 can be completed only when the projection 210 fits in the discrimination hole 4s. Then, a sensor (not shown) detects that the disk cartridge could be inserted to the completion position, and thereafter the entire disk cartridge 100 is moved toward the revolving shaft for the disk to complete the mounting of the disk so as to enable recording and/or reproduction by the disk device.

In the case of a CD caddy which does not have the discrimination hole 4s, the corresponding side portion 4c of a shutter 4 and the leading end of the projection 210 of the disk device collide with each other before the completion of insertion, thus preventing completion of the insertion. Thereby, the mounting of a CD caddy to the disk device is prevented.

Figure 4A:
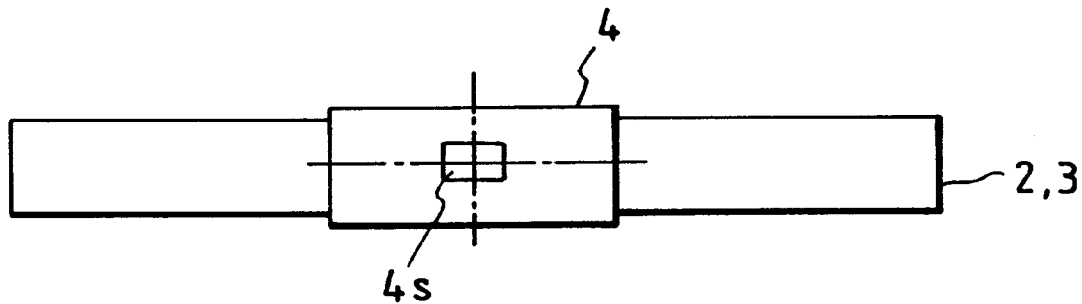
FIGS. 4(a)–4(c) show views of construction of different forms of a discrimination hole provided for the shutter in a disk cartridge according to the present invention.
Figure 4B:
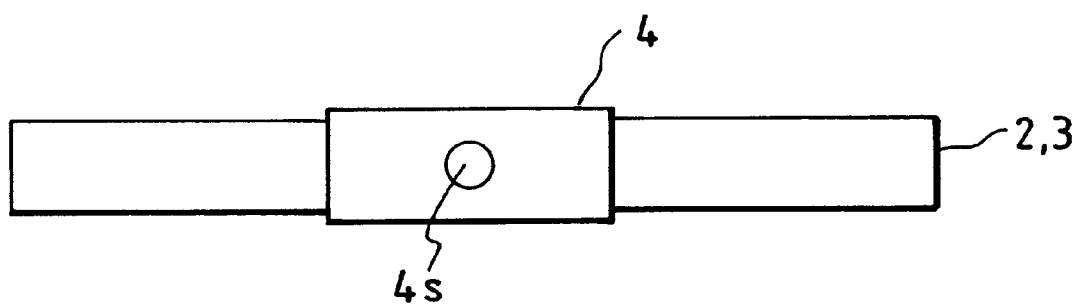
Figure 4C:
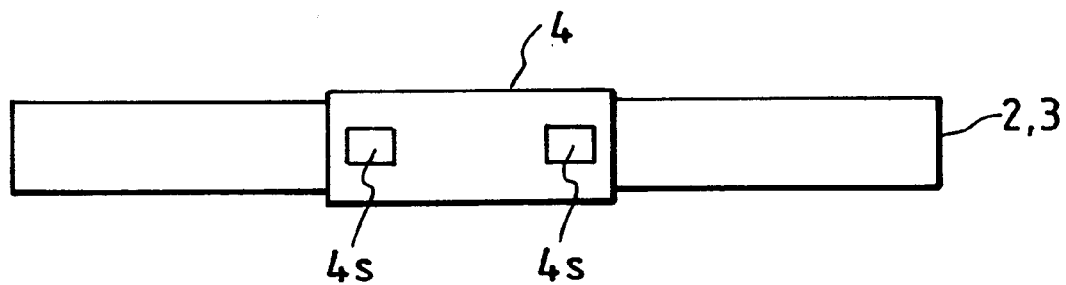
Figure 5A:
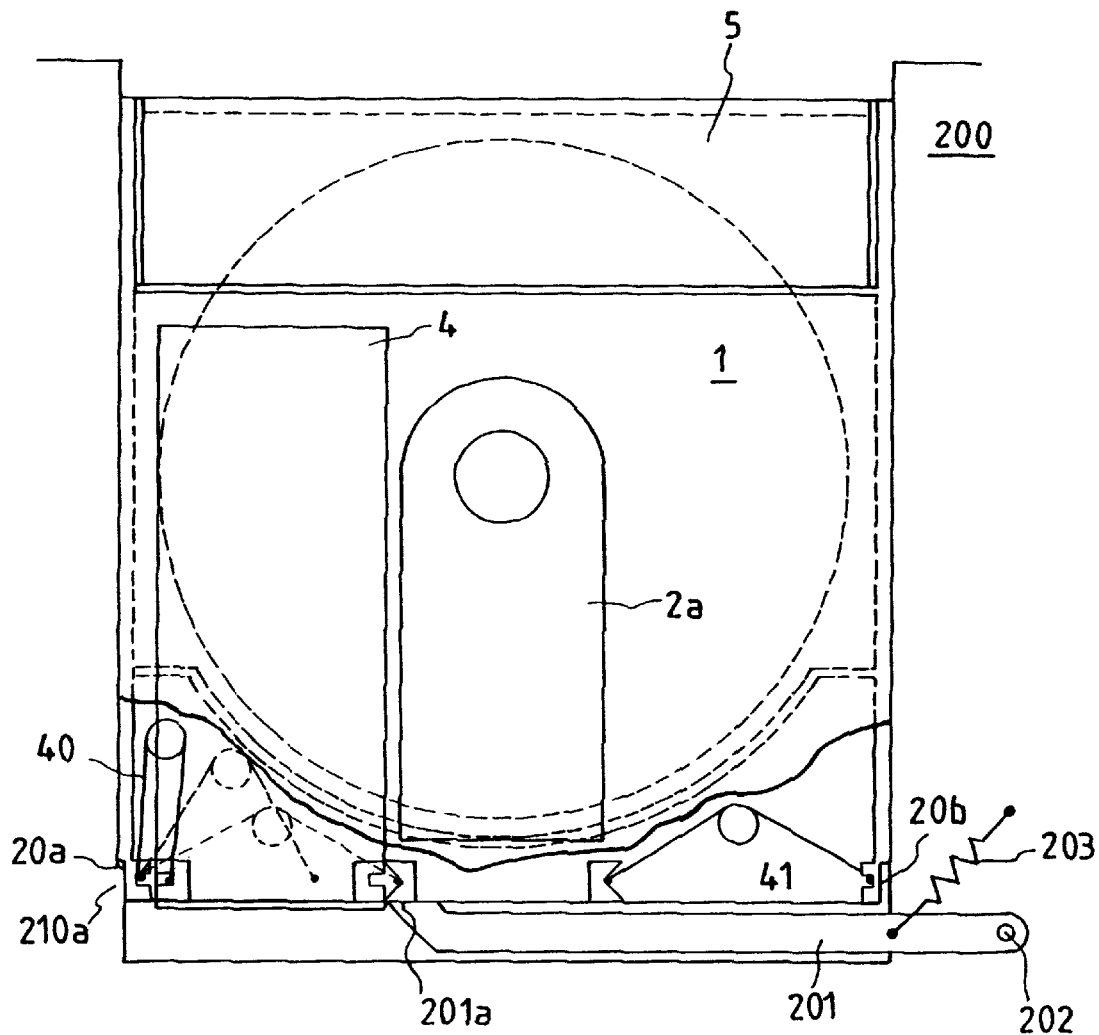
FIGS. 5(a) and 5(b) show a is a plan view and a side view of the construction of a discrimination hole or cutout provided in the case for a disk cartridge according to the present invention.
Figure 5B:
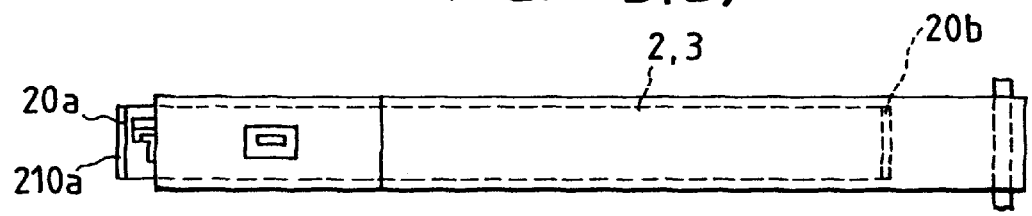

In this respect, according to the present invention, the disk cartridge 100 is constructed laterally symmetrically in the state of FIG. 1. FIGS. 4(a)–4(c) and FIGS. 6(a)–6(d) are side views showing the external shape of the case portions 2 and 3 and the shutter 4. In FIG. 4(a), the discrimination hole 4s is formed at the center of the side portion 4c of the shutter 4 to show a point symmetry therein. When the disk cartridge 100 is turned over for insertion, the design is such that quite the same operation, as shown in FIG. 2 or FIGS. 3(a) and 3(b), can be performed when recording and reproducing on the rear or opposite plane thereof, and the mechanism on the side of the disk device 200, as shown in FIG. 2 or FIGS. 3(a) and 3(b), is capable of coping with the both faces of the disk only by one mechanism, thus achieving the simplified structure of the device and the reduced cost. Although the discrimination hole 4s is rectangular in the present embodiment, as shown in FIG. 4(a), it may be circular or the like, as shown in FIG. 4(b). Also, if a point symmetry is shown at the side portion 4c of the shutter 4 as described above, there may be a plurality of holes, as shown in FIG. 4(c). Also, on the orthogonal plane on the front edge side of the case portions 2 and 3 in the inserting direction, there may be provided cutout portions 20a and 20b so as to show a point symmetry on the orthogonal plane on the front edge side, as shown in FIGS. 5(a) and 5(b), so that a projection 210a is fitted correspondingly thereto. In addition, the cutout portion 20 is sufficient to show a point symmetry, and such layouts, as shown in FIGS. 6(a)–6(d), may be used.

Of the case external dimensions, the width, which is a frontage dimension for insertion into the device, and/or the thickness may be smaller than those of the CD caddy as the cartridge which should be prevented from being inserted.

For the disk utilized for one-side recording, only one of the cutout portions 20a and 20b which corresponds to the recording surface is formed, whereby it becomes possible to discriminate from both-face recording, and to further specify which face is the recording plane.

As regards a combination of the cutout portion of a particular shape and a corresponding projection, all detection arrangements including, for example, the following items can be substituted if a layout thereof is arranged to show a point symmetry on the orthogonal plane on the front edge side.

1) A combination of a light emission diode using an optical arrangement and a light receiving element.

2) A combination of a MR sensor using a magnetic arrangement and a magnet.

3) A combination of a ultrasonic wave oscillator using an acoustic arrangement and its receiver.

4) A combination of a contact switch using an electric arrangement and conductive material.

In this respect, when the disk cartridge 100 is taken out from the disk device 200, the operation is performed conversely to the foregoing, and in FIG. 1 to FIGS. 3(a) and 3(b), the right-hand end 40b of the left-hand spring 40 returns to a state where it is urged by the projection 3p of the case portion 3.

The construction using a torsion spring as the biasing arrangement for the shutter in the present embodiment may be such that one helical tension spring is arranged in a region in which no disk is arranged within the case in a manner to the CD caddy which is currently on the market, and which is occupied by the shutter located in a position where the window is closed.

Figure 6A:
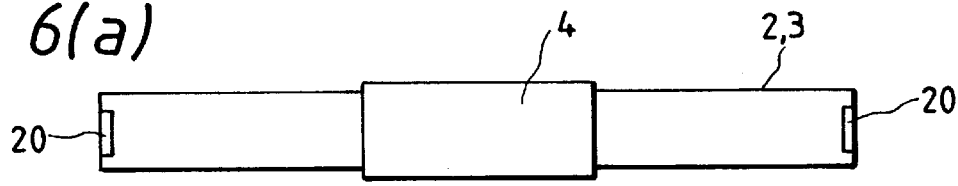
FIGS. 6(a)–6(d) show alternative constructions of a discrimination hole or cutout provided in the case for a disk cartridge according to the present invention.
Figure 6B:
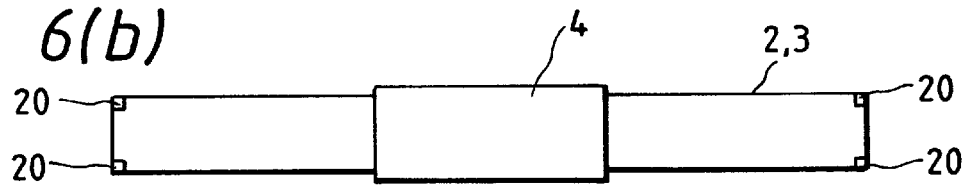
Figure 6C:
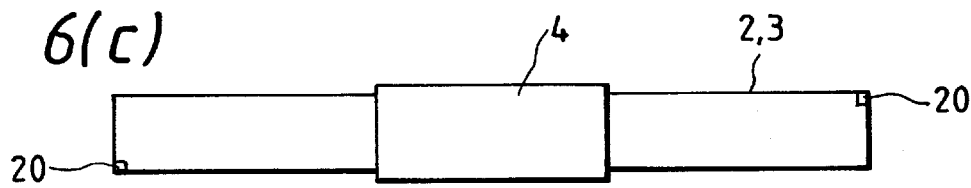
Figure 6D:
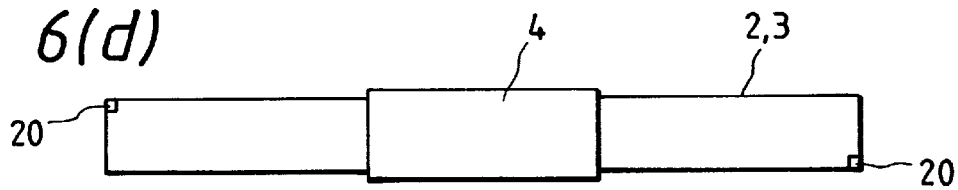
Figure 7:
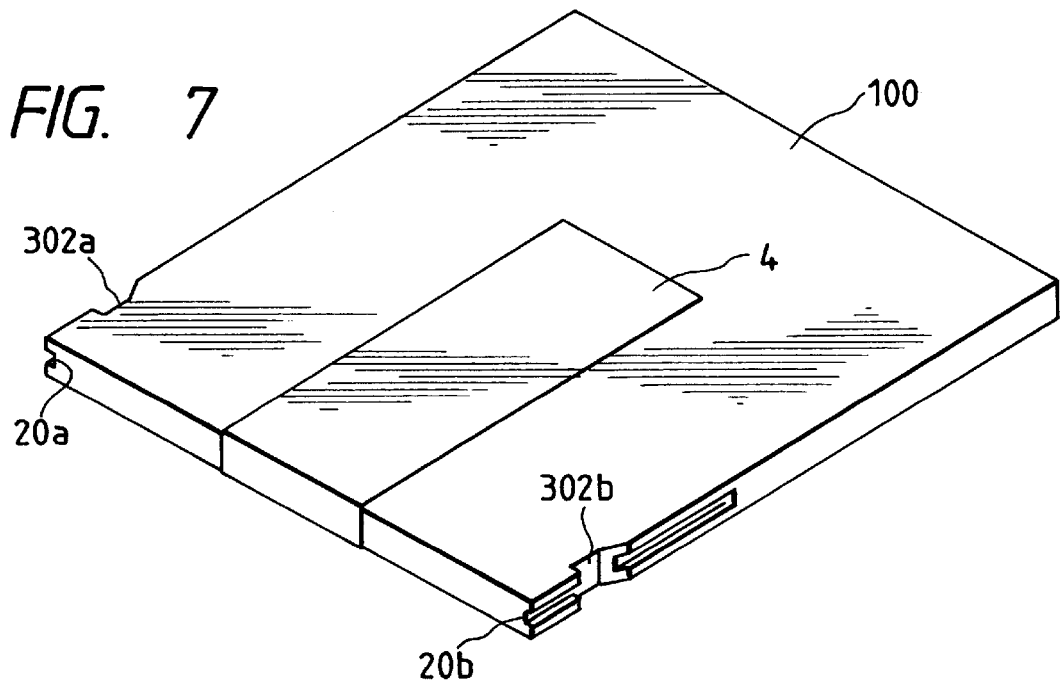
FIG. 7 is a perspective view showing a disk cartridge according to another embodiment the present invention for a tray loading system.

FIG. 7 shows a second embodiment according to the present invention, wherein this embodiment corresponds to a disk device of the tray loading system in addition to the front loading system in the previously described embodiment. FIG. 7 shows a schematic external shape of the disk cartridge, and its interior and shutter structure are the same as those for the previously described first embodiment, but the disk taking-in-and-out structure is not adopted. As the discrimination arrangement and the erroneous insertion prevention arrangement in the front loading system, the cutout portions or grooves 20a and 20b structured in a manner similar to that shown in FIG. 6(a) are formed. In addition thereto, for discrimination and erroneous insertion prevention in the tray loading system, a plane parallel to the disk plane of the disk cartridge 100 is opened on both sides, and the cutout portions 302a and 302b, which pass through in its direction of thickness, are laterally symmetrically provided on the both sides correspondingly to the aforementioned cutout portions 20a and 20b respectively.

Figure 8:
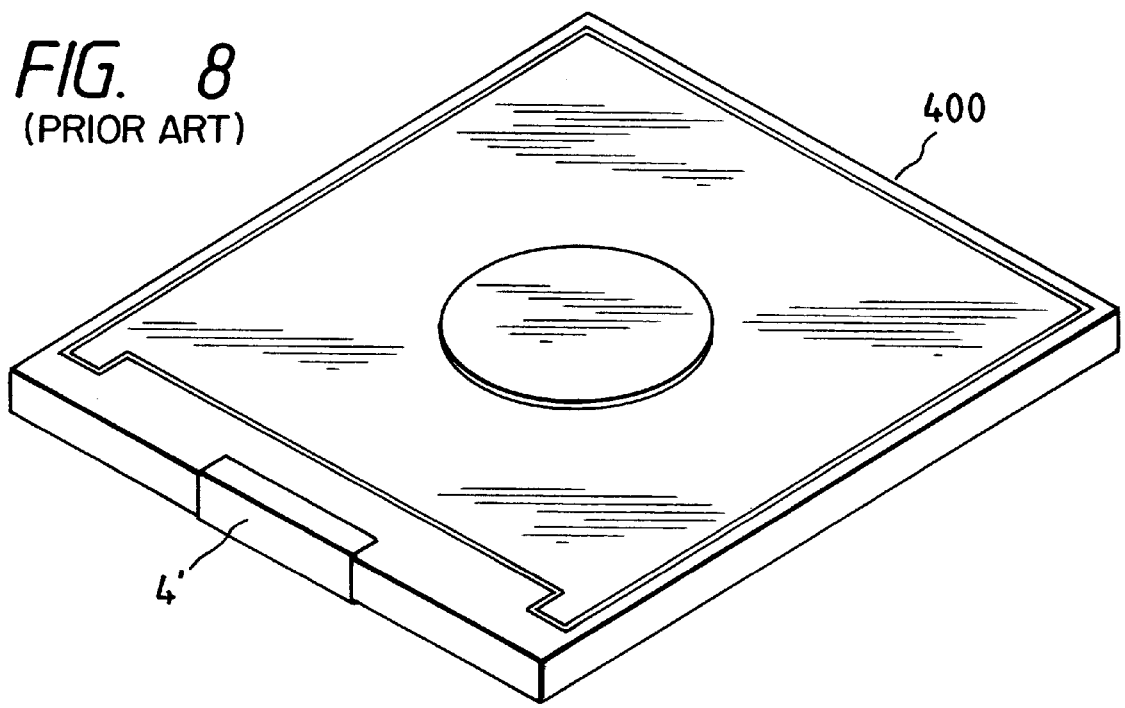
FIG. 8 is a perspective view showing a conventional CD caddy.

FIG. 8 is a perspective view of a conventional CD caddy. As shown, the conventional CD caddy 400 has no cutout portions open in a plane parallel to the disk plane. On the other hand, in FIG. 9, which is a perspective view of a disk cartridge 500 for the PD system, there are additionally provided, in accordance with the present invention, cutout portions 502a and 502b where one side of a plane parallel to the disk plane of the disk cartridge 500 has been opened correspondingly to the side of the recording plane of the one-side recording disk. In FIG. 10, reference numeral 200 designates a disk device; 251, a tray thereof; and 250, a draw-in command button for giving a command to start the tray draw-in operation. In the tray 251, two projections 252a and 252b are provided at positions and shapes corresponding to the cutout portions 302a and 302b.

FIGS. 11(a) and 11(b) show a construction in which a disk cartridge according to the present invention is mounted to the disk device with FIG. 11(a) being a plan view and FIG. 11(b) a side cross-sectional view. In FIG. 11(a), the two projections 252a and 252b provided in the tray 251 coincide with the cutout portions 302a and 302b provided in the disk cartridge 100 in both position and shape respectively for fitting in, and the tray 251 lowers to the lowest position thereof as shown in FIG. 11(b) to complete the mounting. In this state, the front of the draw-in command button 250 is accessible to permit the button to be pressed. In this respect, the disk according to the present invention can be used on both faces thereof. As described above, the projections 252a and 252b provided in the tray 251 and the cutout portions 302a and 302b provided in the disk cartridge 100 are laterally symmetrically provided respectively, and the cutout portions 302a and 302b are constructed so that the plane parallel to the disk plane of the disk cartridge 100 is opened on both sides to pass through in its direction of thickness, whereby the mounting can be completed in quite the same manner, even when the disk cartridge 100 is turned over to use its reverse side.

Figure 9:
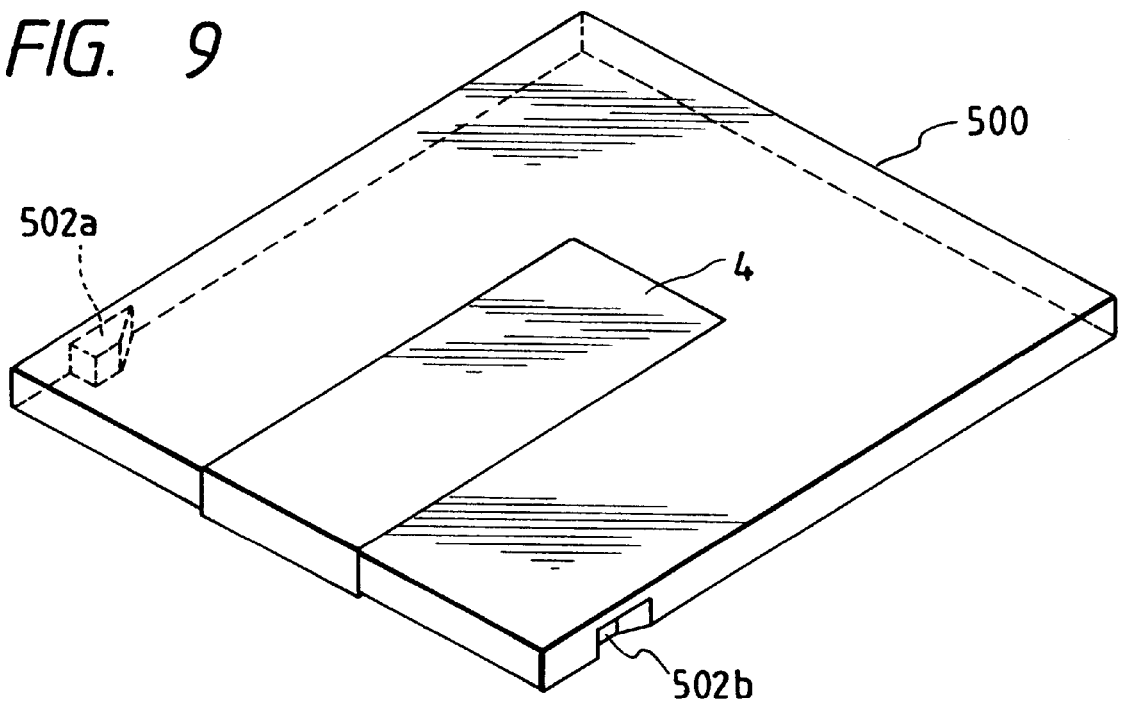
FIG. 9 is a perspective view showing a disk cartridge of a PD system in accordance with the present invention.
Figure 10:
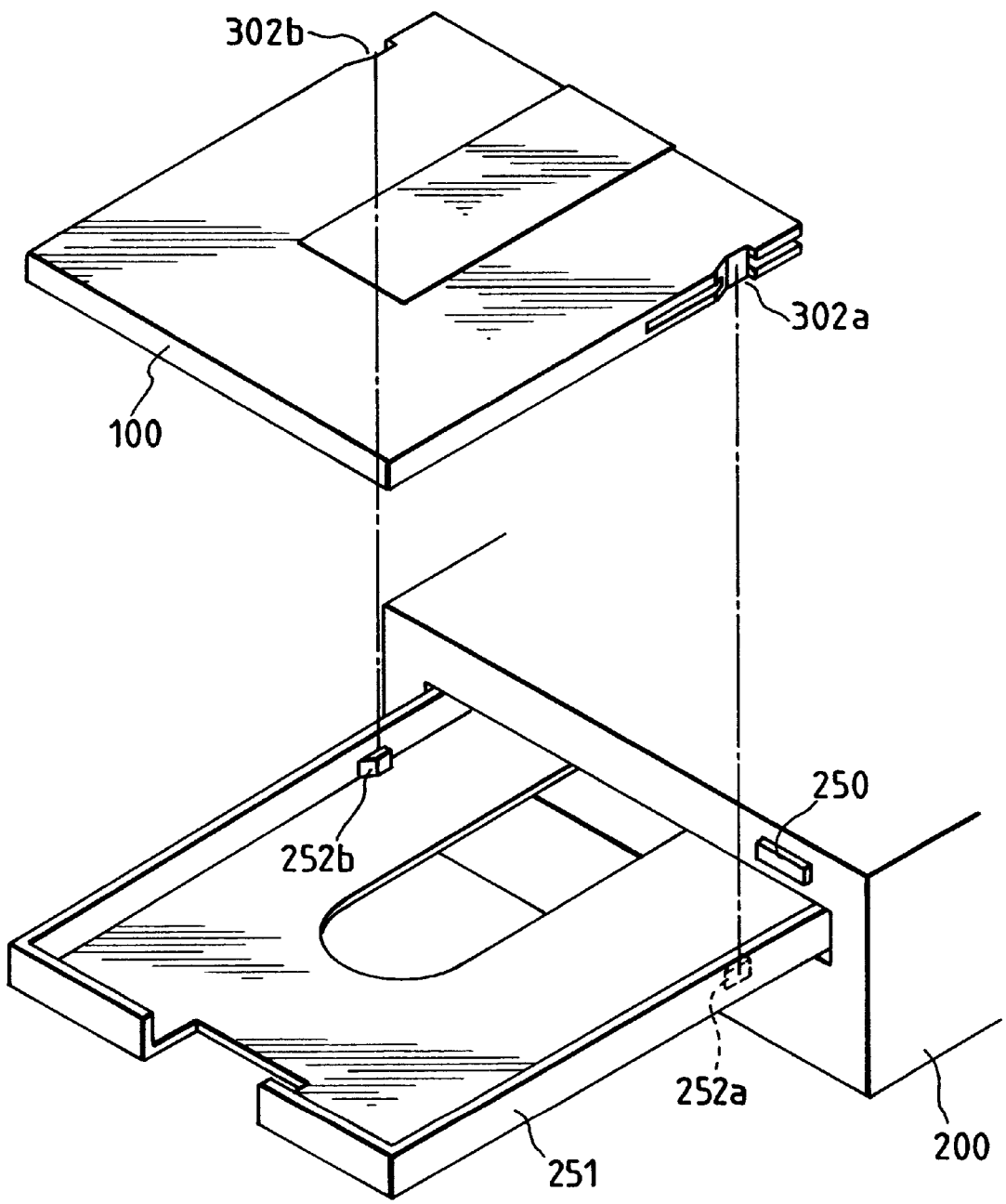
FIG. 10 is a perspective view showing a disk cartridge and a disk device according to the present invention.

The construction in which the disk cartridge for the PD system, as shown in FIG. 9, is mounted is described with reference to FIGS. 12(a) and 12(b) and FIGS. 13(a) and 13(b). The disk for the PD system is used only on one side. FIGS. 12(a) and 12(b) show the construction when the disk cartridge is properly mounted with respect to the plane for use in the disk device with FIG. 12(a) being a plan view and FIG. 12(b) being a side cross-sectional view. In FIG. 12(a), the two projections 252a and 252b provided in the tray 251 coincide with the cutout portions 502a and 502b provided in the disk cartridge 500 in position, shape and height (depth) respectively for fitting in, and the tray 251 lowers to the lowest position thereof as shown in FIG. 12(b) to complete the mounting. In this state, the front of the draw-in command button 250 is accessible to permit the button to be pressed.

On the other hand, FIGS. 13(a) and 13(b) show a construction when the disk cartridge of FIG. 9 has been erroneously mounted to the disk device with its plane for use reversed with FIG. 13(a) being a plan view and FIG. 13(b) being a side cross-sectional view. In FIG. 13(a), the two projections 252a and 252b provided in the tray 251 cannot fit into the cutout portions 502a and 502b provided in the disk cartridge 500 so that the upper portion thereof cannot reach the lowest position of the tray 251 in FIG. 13(b). Accordingly, the mounting cannot be completed. In this state, the draw-in command button 250 is arranged so that the front thereof is rendered inaccessible by the disk cartridge 500 to prevent the button from being pressed.

In this manner,

1) The disk cartridge 500 cannot be accurately mounted.

2) Since the disk cartridge 500 is constructed to be inclined at this time, it is easy to recognize an abnormality.

3) The draw-in command button cannot be pressed.

By the foregoing arrangements, the operator is securely notified of the erroneous insertion. Also, the discrimination is provided ahead of the disk cartridge 500 in the inserting direction into the disk device 200, it is:

1) easy to recognize that the disk cartridge 500 cannot enter because the side of the disk cartridge near the inlet of the device is raised to deviate from the inlet; and 2) easy to use it also as a gripper for holding the disk cartridge 500 which is often provided in the same position.

Such effects as described above can be also obtained if in the two corner regions 50 and 51 of the disk cartridge as shown in FIG. 1(a), which are covered by the movement of the shutter 4, there are provided the discrimination arrangement, so that the discrimination arrangement is utilized for both the front loading system and the tray loading system. The remaining two corner regions of the disk cartridge can be left opened, and this leads to the effect that they can be utilized effectively and provided with a margin having, for example, a reference hole, a disk taking-in-and-out mechanism, or the like. Since the discrimination arrangement is provided at only one side with respect to of the position of the disk center, the discrimination arrangement for the front loading needn't increase the width of the disk cartridge, and this leads to the effect that the disk cartridge can be smaller in size.

FIGS. 14(a) and 14(b) show a construction when the CD caddy 400 which must not be mounted in the tray loading system has been erroneously mounted to the disk device with FIG. 14(a) being a plan view and FIG. 14(b) being a side cross-sectional view. Even if mounted with either side of the plane turned upward, the two projections 252a and 252b provided on the tray 251 in FIG. 14(a) cannot fit in the CD caddy 400, and the mounting cannot be completed in a manner similar to that of FIG. 13(b), thus preventing the draw-in command button 250 from being pressed. Such erroneous insertion can be securely avoided.

In this respect, for all the aforementioned three types of disks, it goes without saying that the structure is arranged to prevent the erroneous insertion even when an attempt to mount the disk cartridge is made in a state where it has been rotated by 90° or 180°.

FIGS. 15(a) and 15(b) show approximate outside dimensions of the disk cartridge according to the present invention with FIG. 15(a) being a plan view and FIG. 15(b) being a side view. In FIG. 15(a), reference numerals 150 and 151 denote the reference holes of the disk cartridge. The letter designations A–L in FIGS. 15(a) and 15(b) have the following dimensions:

A=125 mm
B=137 mm
C=115 mm
D=4 mm
E=0.7 mm
F=2 mm
G=102.5 mm
H=12 mm
I=10 mm
J=5 mm
K=8 mm
L=3 mm

According to the present invention, it is possible to provide a mass storage disk cartridge at low cost in the CD system or the disk system having the substantially same dimensions as it, and there is also provided the effect that it is possible to securely discriminate any disk cartridge of a different type having substantially the same shape.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A disk cartridge system including different types of disk cartridges for use in a disk cartridge drive apparatus comprising:

a first disk cartridge including a first case having a substantially rectangular shape with first, second, third and fourth edges, the first edge of the case being delimited by a first corner portion connecting the first edge and second edge and a second corner portion connecting the first edge and the third edge, the first case having a first groove located in both of the second and third edges and extending along at least a portion of the second and third edges, respectively, and a first disk being housed in the first case; and a second disk cartridge including a second case with a substantially rectangular shape with fifth, sixth, seventh and eighth edges, the fifth edge of the second case being delimited by a fifth corner portion connecting the fifth edge and sixth edge and a sixth corner portion connecting the fifth edge and the seventh edge, the second case having a second groove located in only one of the sixth and seventh edges and extending along a portion of the only one of the sixth and seventh edges, and a second disk being housed in the second case;

wherein a length, width and thickness of the first case are substantially equal to a length, width and thickness of the second case; and wherein a diameter and thickness of the first disk are substantially equal to a diameter and thickness of the second disk.

2. A disk cartridge system according to claim 1, wherein the first disk is a two-sided recordable disk and the second disk is a one-side recordable disk.

3. A disk cartridge system according to claim 1, wherein at least one of the first and second cases have a movable portion enabling taking-in-and-out the first or second disk.

4. A disk cartridge system according to claim 1, wherein the length of both of the first and second cases is about 135 mm, and the width of both of the first and second cases is about 125 mm, and the thickness of both of the first and second cases is about 8 mm; and wherein the diameter of both of the first and second disks is about 120 mm, and the thickness of both of the first and second disks is about 1.2 mm.

5. A disk cartridge system according to claim 1, wherein the first and second grooves enable discrimination of the type of disk cartridge for a front loading system.

6. A disk cartridge system according to claim 1, wherein the first and second cases have a window for exposing a part of the first and second disk cartridge, and further include a shutter member arranged for sliding movement along one of the first and fifth edge, respectively, the shutter member of the first and second disk cartridges being movable in opposite directions with respect to the window thereof from a position in which the window is closed to a position in which the window is open; and wherein the first grooves are disposed in the region of the first and second corner portions and the second groove is disposed in the region of one of the fifth and sixth corner portions.

7. A disk cartridge system according to claim 1, wherein the first disk cartridge and the second disk cartridge are compatibly useable in the disk cartridge system.

8. A disk cartridge system according to claim 1, wherein the first disk cartridge and the second disk cartridge are capable of being taken in from outside of a disk apparatus and to be taken out to outside of the disk apparatus.

9. A disk cartridge system according to claim 1, wherein the first disk cartridge and the second disk cartridge are useable for a common disk device.

10. A disk cartridge system according to claim 1, wherein each of the first grooves extend from the first edge of the first case and the second groove extends from the fifth edge of the second case.

11. A disk cartridge system according to claim 1, wherein the first and second grooves enable discrimination of the first and second disk cartridges from one another.

12. A disk cartridge system according to claim 1, wherein one the first grooves of the first disk cartridge has the same size and location as the second groove of the second disk cartridge.

13. A disk cartridge of one type compatible for use with a different type of disk cartridge for use in a disk cartridge drive apparatus comprising:

one type of disk cartridge including a first disk cartridge having a first case having a substantially rectangular shape with first, second, third and fourth edges, the first edge of the case being delimited by a first corner portion connecting the first edge and second edge and a second corner portion connecting the first edge and the third edge, the first case having a first groove located in both of the second and third edges and extending along at least a portion of the second and third edges, respectively, and a first disk being housed in the first case; and a different type of disk cartridge including a second disk cartridge having a second case with a substantially rectangular shape with fifth, sixth, seventh and eighth edges, the fifth edge of the second case being delimited by a fifth corner portion connecting the fifth edge and sixth edge and a sixth corner portion connecting the fifth edge and the seventh edge, the second case having a second groove located in only one of the sixth edge and the seventh edge extending along a portion of the only one of the sixth and seventh edges, and a second disk being housed in the second case;

wherein a length, width and thickness of the first case are substantially equal to a length, width and thickness of the second case; and wherein a diameter and thickness of the first disk are substantially equal to a diameter and thickness of the second disk.

14. A disk cartridge according to claim 13, wherein the first disk is a two-sided recordable disk and the second disk is a one-side recordable disk.

15. A disk cartridge according to claim 13, wherein at least one of the first and second cases have a movable portion enabling taking-in-and-out the first or second disk.

16. A disk cartridge according to claim 13, wherein the length of both of the first and second cases is about 135 mm, and the width of both of the first and second cases is about 125 mm, and the thickness of both of the first and second cases is about 8 mm; and wherein the diameter of both of the first and second disks is about 120 mm, and the thickness of both of the first and second disks is about 1.2 mm.

17. A disk cartridge according to claim 13, wherein the first and second grooves enable discrimination of the type of disk cartridge for a front loading system.

18. A disk cartridge according to claim 13, wherein the first and second cases have a window for exposing a part of the first and second disk cartridge further include a shutter member arranged for sliding movement along one of the first and fifth edge, respectively, the shutter member of the first and second disk cartridges being movable in opposite directions with respect to the window thereof from a position in which the window is closed to a position in which the window is open; and wherein the first grooves are disposed in the region of the first and second corner portions and the second groove is disposed in the region of one of the fifth and sixth corner portions.

19. A disk cartridge according to claim 13, wherein the first disk cartridge and the second disk cartridge are capable of being taken in from outside of a disk apparatus and to be taken out to outside of the disk apparatus.

20. A disk cartridge according to claim 13, wherein the first disk cartridge and the second disk cartridge are useable for a common disk device.

21. A disk cartridge according to claim 13, wherein each of the first grooves extend from the first edge of the first case and the second groove extends from the fifth edge of the second case.

22. A disk cartridge according to claim 13, wherein the first and second grooves enable discrimination of the first and second disk cartridges from one another.

23. A disk cartridge according to claim 13, wherein one of the first grooves of the first disk cartridge has the same size and location as the second groove of the second disk cartridge.

24. A disk cartridge of one type compatible for use with a different type of disk cartridge for use in a disk cartridge drive apparatus comprising:

one type of disk cartridge including a first disk cartridge having a first case with a substantially rectangular shape with first, second, third and fourth edges, the first edge of the first case being delimited by a first corner portion connecting the first edge and the second edge and a second corner portion connecting the first edge and the third edge, the first case having a first groove located in only one of the second edge and the third edge and extending along a portion of the only one of the second and third edges, and a first disk being housed in the first case; and a different type of disk cartridge including a second disk cartridge having a second case with a substantially rectangular shape with fifth, sixth, seventh and eighth edges, the fifth edge of the case being delimited by a fifth corner portion connecting the fifth edge and the sixth edge and a sixth corner portion connecting the fifth edge and the seventh edge, the second case having a second groove located in both of the sixth and seventh edges and extending along at least a portion of the sixth and seventh edges, respectively, and a second disk being housed in the second case;

wherein a length, width and thickness of the second case are substantially equal to a length, width and thickness of the first case; and wherein a diameter and thickness of the second disk are substantially equal to a diameter and thickness of the first disk.

25. A disk cartridge according to claim 24, wherein the second disk is a two-sided recordable disk and the first disk is a one-side recordable disk.

26. A disk cartridge according to claim 24, wherein at least one of the first and second cases have a movable portion enabling taking-in-and-out the first or second disk.

27. A disk cartridge according to claim 24, wherein the length of both of the first and second cases is about 135 mm, and the width of both of the first and second cases is about 125 mm, and the thickness of both of the first and second cases is about 8 mm; and wherein the diameter of both of the first and second disks is about 120 mm, and the thickness of both of the first and second disks is about 1.2 mm.

28. A disk cartridge according to claim 24, wherein the first and second grooves enable discrimination of the type of disk cartridge for a front loading system.

29. A disk cartridge system according to claim 24, wherein the first and second cases have a window for exposing a part of the first and second disk cartridge, and further include a shutter member arranged for sliding movement along one of the first and fifth edge, respectively, the shutter member of the first and second disk cartridges being movable in opposite directions with respect to the window thereof from a position in which the window is closed to a position in which the window is open; and wherein the first grooves are disposed in the region of the first and second corner portions and the second groove is disposed in the region of one of the fifth and sixth corner portions.

30. A disk cartridge according to claim 24, wherein the first disk cartridge and the second disk cartridge are capable of being taken in from outside of a disk apparatus and to be taken out to outside of the disk apparatus.

31. A disk cartridge according to claim 24, wherein the first disk cartridge and the second disk cartridge are useable for a common disk device.

32. A disk cartridge according to claim 24, wherein each of the first grooves extend from the first edge of the first case and the second groove extends from the fifth edge of the second case.

33. A disk cartridge according to claim 24, wherein the first and second grooves enable discrimination of the first and second disk cartridges from one another.

34. A disk cartridge according to claim 24, wherein one of the first grooves of the first disk cartridge has the same size and location as the second groove of the second disk cartridge.

35. A disk cartridge system including different types of disk cartridges comprising:

a first disk cartridge including a first case having a substantially rectangular shape with first, second, third and fourth edges, the first edge of the case being delimited by a first corner portion connecting the first edge and second edge and a second corner portion connecting the first edge and the third edge, the first case having a first groove located in both of the second and third edges and extending along at least a portion of the second and third edges, respectively, and a first disk being housed in the first case; and a second disk cartridge including a second case with a substantially rectangular shape with fifth, sixth, seventh and eighth edges, the fifth edge of the second case being delimited by a fifth corner portion connecting the fifth edge and sixth edge and a sixth corner portion connecting the fifth edge and the seventh edge, the second case having a second groove located in only one of the sixth and seventh edges and extending along a portion of the only one of the sixth and seventh edges, and a second disk being housed in the second case;

wherein a length, width and thickness of the first case are substantially equal to a length, width and thickness of the second case;

wherein a diameter and thickness of the first disk are substantially equal to a diameter and thickness of the second disk; and wherein each of the first grooves extend from the first edge of the first case and the second groove extends from the fifth edge of the second case.

36. A disk cartridge system according to claim 35, wherein the first disk is a two-sided recordable disk and the second disk is a one-side recordable disk.

37. A disk cartridge system according to claim 35, wherein at least one of the first and second cases have a movable portion enabling taking-in-and-out the first or second disk.

38. A disk cartridge system according to claim 35, wherein the length of both of the first and second cases is about 135 mm, and the width of both of the first and second cases is about 125 mm, and the thickness of both of the first and second cases is about 8 mm; and wherein the diameter of both of the first and second disks is about 120 mm, and the thickness of both of the first and second disks is about 1.2 mm.

39. A disk cartridge system according to claim 35, wherein the first and second grooves enable discrimination of the type of disk cartridge for a front loading system.

40. A disk cartridge system according to claim 35, wherein the first and second cases have a window for exposing a part of the first and second disk cartridge, and further include a shutter member arranged for sliding movement along one of the first and fifth edge, respectively, the shutter member of the first and second disk cartridges being movable in opposite directions with respect to the window thereof from a position in which the window is closed to a position in which the window is open; and wherein the first grooves are disposed in the region of the first and second corner portions and the second groove is disposed in the region of one of the fifth and sixth corner portions.

41. A disk cartridge system according to claim 35, wherein the first disk cartridge and the second disk cartridge are compatibly useable in the disk cartridge system.

42. A disk cartridge system according to claim 35, wherein the first disk cartridge and the second disk cartridge are capable of being taken in from outside of a disk apparatus and to be taken out to outside of the disk apparatus.

43. A disk cartridge system according to claim 35, wherein the first disk cartridge and the second disk cartridge are useable for a common disk device.

44. A disk cartridge system according to claim 35, wherein the first and second grooves enable discrimination of the first and second disk cartridges from one another.

45. A disk cartridge system according to claim 35, wherein one of the first grooves of the first disk cartridge has the same size and location as the second groove of the second disk cartridge.

46. A disk cartridge of one type compatible for use with a different type of disk cartridge comprising:

one type of disk cartridge including a first disk cartridge having a first case having a substantially rectangular shape with first, second, third and fourth edges, the first edge of the case being delimited by a first corner portion connecting the first edge and second edge and a second corner portion connecting the first edge and the third edge, the first case having a first groove located in both of the second and third edges and extending along at least a portion of the second and third edges, respectively, and a first disk being housed in the first case; and a different type of disk cartridge including a second disk cartridge having a second case with a substantially rectangular shape with fifth, sixth, seventh and eighth edges, the fifth edge of the second case being delimited by a fifth corner portion connecting the fifth edge and sixth edge and a sixth corner portion connecting the fifth edge and the seventh edge, the second case having a second groove located in only one of the sixth edge and the seventh edge extending along a portion of the only one of the sixth and seventh edges, and a second disk being housed in the second case;

wherein a length, width and thickness of the first case are substantially equal to a length, width and thickness of the second case;

wherein a diameter and thickness of the first disk are substantially equal to a diameter and thickness of the second disk; and wherein each of the first grooves extend from the first edge of the first case and the second groove extends from the fifth edge of the second case.

47. A disk cartridge according to claim 46, wherein the first disk is a two-sided recordable disk and the second disk is a one-side recordable disk.

48. A disk cartridge according to claim 46, wherein at least one of the first and second cases have a movable portion enabling taking-in-and-out the first or second disk.

49. A disk cartridge according to claim 46, wherein the length of both of the first and second cases is about 135 mm, and the width of both of the first and second cases is about 125 mm, and the thickness of both of the first and second cases is about 8 mm; and wherein the diameter of both of the first and second disks is about 120 mm, and the thickness of both of the first and second disks is about 1.2 mm.

50. A disk cartridge according to claim 46, wherein the first and second grooves enable discrimination of the type of disk cartridge for a front loading system.

51. A disk cartridge according to claim 46, wherein the first and second cases have a window for exposing a part of the first and second disk cartridge further include a shutter member arranged for sliding movement along one of the first and fifth edge, respectively, the shutter member of the first and second disk cartridges being movable in opposite directions with respect to the window thereof from a position in which the window is closed to a position in which the window is open; and wherein the first grooves are disposed in the region of the first and second corner portions and the second groove is disposed in the region of one of the fifth and sixth corner portions.

52. A disk cartridge according to claim 46, wherein the first disk cartridge and the second disk cartridge are capable of being taken in from outside of a disk apparatus and to be taken out to outside of the disk apparatus.

53. A disk cartridge according to claim 46, wherein the first disk cartridge and the second disk cartridge are useable for a common disk device.

54. A disk cartridge according to claim 46, wherein the first and second grooves enable discrimination of the first and second disk cartridges from one another.

55. A disk cartridge according to claim 46, wherein one of the first grooves of the first disk cartridge has the same size and location as the second groove of the second disk cartridge.

56. A disk cartridge of one type compatible for use with a different type of disk cartridge for use in a disk cartridge drive apparatus comprising:

one type of disk cartridge including a first disk cartridge having a first case with a substantially rectangular shape with first, second, third and fourth edges, the first edge of the first case being delimited by a first corner portion connecting the first edge and the second edge and a second corner portion connecting the first edge and the third edge, the first case having a first groove located in only one of the second edge and the third edge and extending along a portion of the only one of the second and third edges, and a first disk being housed in the first case; and a different type of disk cartridge including a second disk cartridge having a second case with a substantially rectangular shape with fifth, sixth, seventh and eighth edges, the fifth edge of the case being delimited by a fifth corner portion connecting the fifth edge and the sixth edge and a sixth corner portion connecting the fifth edge and the seventh edge, the second case having a second groove located in both of the sixth and seventh edges and extending along at least a portion of the sixth and seventh edges, respectively, and a second disk being housed in the second case;

wherein a length, width and thickness of the second case are substantially equal to a length, width and thickness of the first case;

wherein a diameter and thickness of the second disk are substantially equal to a diameter and thickness of the first disk; and wherein each of the first grooves extend from the first edge of the first case and the second groove extends from the fifth edge of the second case.

57. A disk cartridge according to claim 56, wherein the second disk is a two-sided recordable disk and the first disk is a one-side recordable disk.

58. A disk cartridge according to claim 56, wherein at least one of the first and second cases have a movable portion enabling taking-in-and-out the first or second disk.

59. A disk cartridge according to claim 56, wherein the length of both of the first and second cases is about 135 mm, and the width of both of the first and second cases is about 125 mm, and the thickness of both of the first and second cases is about 8 mm; and wherein the diameter of both of the first and second disks is about 120 mm, and the thickness of both of the first and second disks is about 1.2 mm.

60. A disk cartridge according to claim 56, wherein the first and second grooves enable discrimination of the type of disk cartridge for a front loading system.

61. A disk cartridge according to claim 56, wherein the first and second cases have a window for exposing a part of the first and second disk cartridge, and further include a shutter member arranged for sliding movement along one of the first and fifth edge, respectively, the shutter member of the first and second disk cartridges being movable in opposite directions with respect to the window thereof from a position in which the window is closed to a position in which the window is open; and wherein the first grooves are disposed in the region of the first and second corner portions and the second groove is disposed in the region of one of the fifth and sixth corner portions.

62. A disk cartridge according to claim 56, wherein the first disk cartridge and the second disk cartridge are capable of being taken in from outside of a disk apparatus and to be taken out to outside of the disk apparatus.

63. A disk cartridge according to claim 56, wherein the first disk cartridge and the second disk cartridge are useable for a common disk device.

64. A disk cartridge according to claim 56, wherein the first and second grooves enable discrimination of the first and second disk cartridges from one another.

65. A disk cartridge according to claim 56, wherein one of the first grooves of the first disk cartridge has the same size and location as the second groove of the second disk cartridge.

* * * * *